(12) United States Patent
Ninomiya et al.

(10) Patent No.: US 9,194,354 B2
(45) Date of Patent: Nov. 24, 2015

(54) FUEL GAS SUPPLYING AND FILLING SYSTEM

(75) Inventors: Makoto Ninomiya, Kobe (JP); Kaoru Nomichi, Ono (JP); Yutaka Suzuki, Kobe (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 322 days.

(21) Appl. No.: 13/880,568

(22) PCT Filed: Oct. 18, 2011

(86) PCT No.: PCT/JP2011/005819
§ 371 (c)(1),
(2), (4) Date: Jun. 10, 2013

(87) PCT Pub. No.: WO2012/053192
PCT Pub. Date: Apr. 26, 2012

(65) Prior Publication Data
US 2013/0255808 A1    Oct. 3, 2013

(30) Foreign Application Priority Data

Oct. 19, 2010    (JP) .................................. 2010-234650

(51) Int. Cl.
*F16K 31/02* (2006.01)
*F02M 69/54* (2006.01)
(Continued)

(52) U.S. Cl.
CPC .......... *F02M 69/54* (2013.01); *F02M 21/0239* (2013.01); *F02M 21/0242* (2013.01);
(Continued)

(58) Field of Classification Search
CPC .......... F02M 21/0239; F02M 21/0242; F02M 51/061; F02M 69/54
USPC ......... 137/487, 487.5, 613, 624.27, 862, 870; 123/458, 490
See application file for complete search history.

(56) References Cited

U.S. PATENT DOCUMENTS 6,427,670 B2 *    8/2002    Goto et al. .................... 123/529
6,446,616 B1 *    9/2002    Kabat et al. .................. 123/527
(Continued)

FOREIGN PATENT DOCUMENTS

JP    A-4-86362        3/1992
JP    A-10-252568      9/1998
(Continued)

OTHER PUBLICATIONS

International Search Report issued in International Patent Application No. PCT/JP2011/005819 mailed Jan. 24, 2012.
(Continued)

*Primary Examiner* — John K Fristoe, Jr.
*Assistant Examiner* — Reinaldo Sanchez-Medina
(74) *Attorney, Agent, or Firm* — Oliff PLC

(57) ABSTRACT

A fuel gas supplying and filling system for a fuel gas consuming unit, capable of using a supply passage in both filling and supplying operations and improving the airtightness and reliability of a fill passage. A high-pressure tank and a fuel gas consuming unit are connected to each other by a supply passage, and an electromagnetic pressure regulating valve is provided on the supply passage. An electromagnetic on-off valve is provided between the electromagnetic pressure regulating valve and the high-pressure tank. A fill passage is connected to a portion of the supply passage, the portion being located between the electromagnetic pressure regulating valve and the electromagnetic on-off valve. The fill passage is configured such that the high-pressure fuel gas can be supplied through a filling opening. When the high-pressure fuel gas is introduced to a downstream side of the electromagnetic on-off valve, the electromagnetic on-off valve opens the supply passage.

9 Claims, 7 Drawing Sheets

(51) Int. Cl.
  *F02M 21/02* (2006.01)
  *G05D 16/20* (2006.01)

(52) U.S. Cl.
  CPC ....... *F02M21/0245* (2013.01); *F02M 21/0293* (2013.01); *G05D 16/2013* (2013.01); *F17C 2205/0326* (2013.01); *F17C 2205/0338* (2013.01); *F17C 2221/012* (2013.01); *F17C 2223/0123* (2013.01); *F17C 2223/036* (2013.01); *F17C 2225/0123* (2013.01); *F17C 2225/033* (2013.01); *F17C 2250/043* (2013.01); *F17C 2260/024* (2013.01); *F17C 2260/038* (2013.01); *F17C 2265/066* (2013.01); *F17C 2270/0168* (2013.01); *F17C 2270/0184* (2013.01); *Y02E 60/321* (2013.01); *Y02T 10/32* (2013.01); *Y10T 137/86485* (2015.04)

(56) References Cited

U.S. PATENT DOCUMENTS

| | | |
|---|---|---|
| 2001/0032628 A1 | 10/2001 | Goto et al. |
| 2002/0117156 A1* | 8/2002 | Ricco ............................ 123/527 |
| 2005/0252495 A1* | 11/2005 | Ricco et al. ................... 123/529 |
| 2008/0110514 A1 | 5/2008 | Yoshida |

FOREIGN PATENT DOCUMENTS

| | | |
|---|---|---|
| JP | A-2002-295313 | 10/2002 |
| JP | A-2002-295709 | 10/2002 |
| JP | A-2003-286903 | 10/2003 |
| JP | A-2006-118519 | 5/2006 |
| JP | 2011-052750 A | 3/2011 |

OTHER PUBLICATIONS

Nov. 13, 2014 Partial Supplementary European Search Report issued in Application No. 11834038.9.

Office Action and search report issued in Chinese Patent Application No. 201180046355.9 dated Aug. 4, 2014 (with partial English translation).

Apr. 8, 2015 Extended Search Report issued in European Application No. 11834038.9.

* cited by examiner

FUEL GAS SUPPLYING AND FILLING SYSTEM

TECHNICAL FIELD

The present invention relates to a fuel gas supplying and filling system configured to supply a fuel gas to a fuel gas consuming unit, such as a gas engine or a fuel cell.

BACKGROUND ART

Examples of automobiles include gasoline automobiles using gasoline and diesel automobiles using light oil. In addition to these, gas engine automobiles and fuel-cell vehicles using a fuel gas, such as a compressed natural gas (CNG) or compressed hydrogen, have been known. In the gas engine automobile or the fuel-cell vehicle, the fuel gas is stored in, for example, a high-pressure tank, and the stored high-pressure fuel gas is supplied to a gas engine or a fuel cell (fuel gas consuming unit) through a fuel gas supplying and filling system. Known as the fuel gas supplying and filling system is, for example, a fuel supply apparatus of a gas engine in PTL 1.

The fuel supply apparatus of the gas engine described in PTL 1 includes a fuel injection valve, and the fuel injection valve and a bomb (high-pressure tank) are connected to each other by a pipe. On a passage of this pipe, a main stop valve, a regulator, and a low-pressure fuel shutoff valve are provided in this order from the bomb side. A fill passage on which a check valve is provided is connected to the passage so as to be closer to the bomb than the main stop valve (to be specific, located upstream of the main stop valve). The check valve allows the fuel gas to flow through a filling opening, formed at a tip end of the fill passage, into the passage and blocks the opposite flow of the fuel gas.

In the fuel supply apparatus of the gas engine configured as above, when the high-pressure fuel gas is supplied through the filling opening, the fuel gas opens the check valve to flow into the pipe and is then introduced to the bomb to be stored in the bomb. With this, the fuel gas can be filled in the bomb.

CITATION LIST

Patent Literature

PTL 1: Japanese Laid-Open Patent Application Publication No. 2002-295313

SUMMARY OF INVENTION

Technical Problem

In the fuel supply apparatus of the gas engine described in PTL 1 and configured to supply to the fuel gas consuming unit the gas of pressure controlled with a high degree of accuracy, the fill passage is provided upstream of the regulator and the main stop valve. Therefore, in a case where the leakage from the fill passage and the check valve has occurred, there is no means to stop the leakage of the gas in the tank to the outside. To improve the airtightness and reliability of the fill passage, an on-off valve may be provided on a fill pipe. However, since this increases components, the installation space of the fuel supply apparatus increases, and the cost increases. Therefore, this configuration is not preferable.

Here, an object of the present invention is to provide a fuel gas supplying and filling system for a fuel gas consuming unit, the fuel gas supplying and filling system being capable of using a supply passage in both filling and supplying operations and improving the airtightness and reliability of a fill passage without increasing components.

Solution to Problem

A fuel gas supplying and filling system of the present invention includes: a supply passage configured to connect a fuel gas consuming unit configured to consume a fuel gas, a high-pressure tank configured to store the fuel gas of high pressure, and the fuel gas consuming unit; a pressure regulating valve provided on the supply passage and configured to regulate pressure of the fuel gas flowing through the supply passage; and an electromagnetic on-off valve provided on the supply passage so as to be located upstream of the pressure regulating valve and configured to be able to open and close the supply passage, wherein: a fill passage is connected to a portion of the supply passage, the portion being located between the pressure regulating valve and the electromagnetic on-off valve; the fill passage is configured such that the fuel gas of the high pressure is able to be filled through a filling opening; and when the fuel gas of the high pressure is introduced through the filling opening to a downstream side of the electromagnetic on-off valve, the electromagnetic on-off valve opens the supply passage, which has been shut off by the electromagnetic on-off valve.

According to the present invention, the electromagnetic on-off valve is provided on the supply passage, and the supply passage can be closed by the electromagnetic on-off valve. Therefore, the fuel gas flowing from the high-pressure tank to the pressure regulating valve can be shut off. In addition, the fill passage is connected to a portion of the supply passage, the portion being located between the electromagnetic on-off valve and the pressure regulating valve. When the fuel gas is supplied to the fill passage through its filling opening, the fuel gas flows through the supply passage to be introduced to the electromagnetic on-off valve. Since the electromagnetic on-off valve is a bidirectional electromagnetic on-off valve, the electromagnetic on-off valve opens the closed supply passage by introducing the high-pressure fuel gas to the downstream side of the electromagnetic on-off valve. With this, the high-pressure fuel gas flows through the electromagnetic on-off valve to be introduced to the high-pressure tank, and the high-pressure tank is filled with the fuel gas. As above, a part of the supply passage can be used in both the filling and supplying operations.

In the present invention, since the electromagnetic on-off valve configured to open and close the supply passage is provided closer to the high-pressure tank than the fill passage, the electromagnetic on-off valve can be utilized as a shutoff valve configured to shut off communication between the high-pressure tank and the fill passage. Therefore, since the electromagnetic on-off valve serves as a check valve when in a closed state, the airtightness and reliability of the fill passage can be improved without additionally providing components, such as a shutoff valve, on the fill passage.

In the above invention, it is preferable that the fuel gas supplying and filling system further include: a check valve provided on the fill passage and configured to allow the fuel gas to flow through the filling opening toward the supply passage and block the fuel gas flowing in its opposite direction; a leakage detecting unit configured to detect leakage from the fill passage; and a control unit configured to control an operation of the electromagnetic on-off valve, wherein in a case where the control unit determines based on a detection result of the leakage detecting unit that the leakage from the filling opening is occurring, the control unit causes the electromagnetic on-off valve to shut off the supply passage.

According to the above configuration, when the fuel gas is not supplied through the filling opening, the fill passage is being closed by the check valve. If the fuel gas leaks from the filling opening, the leakage detecting unit can detect this leakage, and the electromagnetic on-off valve can shut off the supply passage to stop the leakage of the fuel gas. As above, the electromagnetic on-off valve provided on the supply passage can be utilized as a shutoff valve which can be remotely manipulated when the leakage has occurred at the fill passage.

In the above invention, it is preferable that: the leakage detecting unit be a high-pressure-side pressure detector provided on the supply passage and configured to detect gas pressure between the pressure regulating valve and the electromagnetic on-off valve; and in a case where the gas pressure detected by the high-pressure-side pressure detector is rapidly dropping, the control unit determine that the leakage from the fill passage is occurring.

According to the above configuration, the leakage from the filling opening can be detected by the high-pressure-side pressure detector configured to detect the pressure of the supply passage. Therefore, an additional component for detecting the leakage is not required, and the number of parts can be reduced.

In the above invention, it is preferable that: the pressure regulating valve be a normally closed electromagnetic pressure regulating valve configured to regulate the pressure of the fuel gas, flowing through the supply passage, to pressure corresponding to a current supplied to the pressure regulating valve and close the supply passage when the current supplied from the control unit is stopped; a low-pressure-side pressure detector be provided on the supply passage and configured to detect the gas pressure at a portion closer to the fuel gas consuming unit than the electromagnetic pressure regulating valve; the control unit configured to control the current supplied to the electromagnetic pressure regulating valve be connected to the electromagnetic pressure regulating valve; and the control unit control the current such that the gas pressure detected by the low-pressure-side pressure detector becomes predetermined target pressure.

According to the above configuration, in a case where the pressure of the fuel gas detected by the low-pressure-side pressure detecting unit is not the target pressure, the controller adjusts the current, supplied to the electromagnetic pressure regulating valve, such that the pressure of the fuel gas becomes the target pressure, that is, performs feedback control in which the pressure of the fuel gas is adjusted such that the pressure of the fuel gas becomes the target pressure. By this feedback control, the pressure of the fuel gas can be controlled to the target pressure with a high degree of accuracy.

In the present invention, the electromagnetic pressure regulating valve is a normally closed valve. Therefore, by stopping the current supplied to the electromagnetic pressure regulating valve to adjust the pressure of the fuel gas, the supply passage can be urgently shut off. With this, for example, even if an unintended high-pressure fuel gas is supplied to the fuel gas consuming unit, the supply passage can be immediately shut off, and the fuel gas consuming unit can be prevented from being damaged. Since the electromagnetic pressure regulating valve has the shutoff function, the number of shutoff valves provided on the supply passage can be reduced, and therefore the manufacturing cost of the fuel gas supplying and filling system can be reduced. By reducing the number of components of the fuel gas supplying and filling system, the pressure loss in the fuel gas supplying and filling system can be reduced, and the fuel gas supplying and filling system can be reduced in size.

In the above invention, it is preferable that: the electromagnetic pressure regulating valve include a housing including a valve passage connecting a primary port connected to the high-pressure tank and a secondary port connected to the fuel gas consuming unit, a valve body provided in the housing and configured to move between a closed position where the valve body closes the valve passage and an open position where the valve body opens the valve passage to control an opening degree of the valve passage, a return spring configured to bias the valve body in a direction toward the closed position, an electromagnetic proportional solenoid configured to apply a magnetizing force, corresponding to the current supplied from the control unit, to the valve body to cause the valve body to move in a direction toward the open position, a bearing member interposed between the valve body and the housing and configured to support the valve body such that the valve body is able to slide between the closed position and the open position, and a first sealing member and a second sealing member configured to respectively seal both sides of the bearing member; a pressure return chamber connected to the secondary port is formed in the housing; and the second sealing member applies an acting force, corresponding to internal pressure of the pressure return chamber, to the valve body to cause the valve body to move in the direction toward the closed position.

According to the above configuration, the opening degree of the valve passage is changed by changing the magnetizing force of the electromagnetic proportional solenoid. With this, the pressure output from the secondary port, that is, the secondary pressure can be regulated. By setting the magnetizing force to a force corresponding to the target pressure, the secondary pressure can be controlled to the target pressure. The secondary pressure is introduced to the pressure return chamber, and the second sealing member applies an acting force, corresponding to internal pressure of the pressure return chamber, to the valve body to cause the valve body to move in the direction toward the closed position. The valve body which receives the above acting force moves up to a position where the forces, such as the secondary pressure received by the valve body, the acting force from the second sealing member, the magnetizing force, and the biasing force of the return spring, acting on the valve body are balanced. In order to balance the above forces, the opening degree of the valve passage is adjusted. With this, even if the secondary pressure fluctuates, the opening degree of the valve passage is adjusted, and the secondary pressure is returned to the target pressure. Therefore, the secondary pressure is maintained at the target pressure. Since the electromagnetic pressure regulating valve can maintain the secondary pressure at the target pressure as above, it is high in pressure controllability and can regulate the pressure of the high-pressure fuel gas more precisely.

Further, in the present invention, since the valve body can move smoothly by the bearing member, the followability with respect to the target pressure is improved. Then, since the first and second sealing members are respectively provided on both sides of the bearing member, the fuel gas does not flow toward the bearing member, and the bearing member is prevented from being exposed to the fuel gas. With this, a material having no corrosion resistance to the fuel gas can be used as a material of the bearing member, and this increases material options of the bearing member. Further, for example, when the bearing member is lubricated with grease, the grease can be prevented from flowing out to the secondary port side together with the fuel gas. With this, the smooth movement of the valve body can be realized, and the grease can be prevented from being mixed with the fuel gas.

In the above invention, it is preferable that: the valve body include a secondary side pressure receiving portion on which pressure of the secondary port acts in a direction in which the valve body moves toward the open position and a pressure return chamber side pressure receiving portion on which pressure of the pressure return chamber acts in a direction in which the valve body moves toward the closed position; and a pressure receiving area of the pressure return side pressure receiving portion be larger than a pressure receiving area of the secondary side pressure receiving portion.

According to the above configuration, the secondary side pressure receiving portion and the pressure return chamber side pressure receiving portion receive the secondary pressure. Since the pressure receiving area of the pressure return side pressure receiving portion is larger than that of the secondary side pressure receiving portion, the forces acting on the pressure receiving portions act in the direction toward the closed position. Therefore, when the electromagnetic proportional solenoid is not driving, the valve body is biased in the direction toward the closed position. Thus, a more reliable normally closed valve structure can be realized.

In the above invention, it is preferable that: the valve body include a first pressure receiving surface on which pressure of the primary port acts in a direction in which the valve body moves toward the open position and a second pressure receiving surface on which the pressure of the primary port acts in a direction in which the valve body moves toward the closed position; and a pressure receiving area of the first pressure receiving surface and a pressure receiving area of the second pressure receiving surface be substantially equal to each other.

According to the above configuration, the primary pressure received by the first pressure receiving surface and the primary pressure received by the second pressure receiving surface cancel each other. With this, the fluctuation in the acting force applied to the valve body due to the fluctuation in the primary pressure can be eliminated, and the pressure controllability of the secondary pressure can be further improved. In addition, the magnetizing force of the electromagnetic proportional solenoid can be reduced, and the electromagnetic pressure regulating valve can be reduced in size.

In the above invention, it is preferable that the low-pressure-side pressure detecting unit be provided near the fuel gas consuming unit.

According to the above configuration, the pressure of the fuel gas introduced to the fuel gas consuming unit can be controlled to the target pressure with a high degree of accuracy regardless of the fuel gas pressure loss caused in the supply passage and various devices provided on the supply passage. Therefore, the degree of freedom of the length of the supply passage, the configurations of the devices provided on the supply passage, and the like increases. Thus, the degree of freedom of the design of the fuel gas supplying and filling system improves.

In the above invention, it is preferable that when the gas pressure detected by the low-pressure-side pressure detecting unit becomes predetermined allowable pressure or higher, the control unit stop the current supplied to the electromagnetic pressure regulating valve.

According to the above configuration, when the pressure of the fuel gas introduced to the fuel gas consuming unit increases sharply, the supply of the fuel gas to the fuel gas consuming unit can be stopped. With this, the pressure of the fuel gas in the fuel gas consuming unit can be prevented from becoming abnormal pressure that is allowable pressure or higher.

In the above invention, it is preferable that the electromagnetic on-off valve be included in an in tank type or on tank type electromagnetic container main valve provided at a supply port of the high-pressure tank.

According to the above configuration, since the electromagnetic on-off valve can be remotely controlled by, for example, the control unit, the supply passage connected to the high-pressure tank can be shut off urgently. With this, the gas supply from the high-pressure tank can be shut off at the time of emergency, such as at the time of the detection of the occurrence of the leakage, so that the continuous outflow of the high-pressure gas from the high-pressure tank can be prevented. Thus, the safety of the fuel gas supplying and filling system can be further improved.

In the above invention, it is preferable that the electromagnetic pressure regulating valve be included in an in tank type or on tank type electromagnetic container main valve provided at a supply port of the high-pressure tank.

According to the above configuration, since the electromagnetic pressure regulating valve is provided at the supply port of the high-pressure tank, the output pressure level from the high-pressure tank becomes low pressure. Thus, the safety of the system improves.

Advantageous Effects of Invention

The present invention can provide the fuel gas supplying and filling system for the fuel gas consuming unit, the fuel gas supplying and filling system being capable of using the supply passage in both the filling and supplying operations and improving the reliability with respect to the leakage from the fill passage without increasing the number of components.

The above object, other objects, features and advantages of the present invention will be made clear by the following detailed explanation of preferred embodiments with reference to the attached drawings.

DESCRIPTION OF EMBODIMENTS

Figure 1:
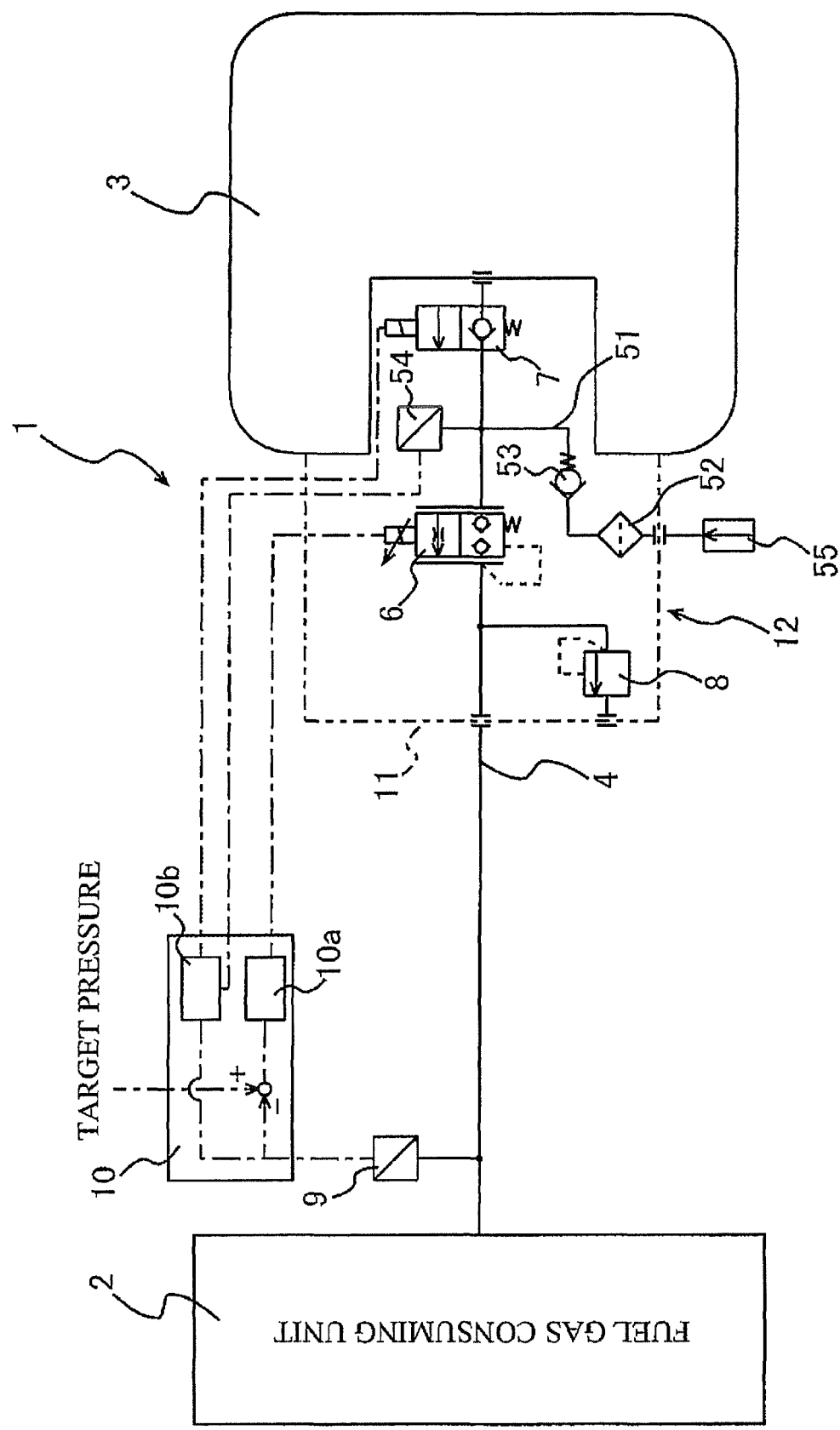
FIG. 1 is a circuit diagram showing the configuration of a fuel gas supplying and filling system of Embodiment 1.

Hereinafter, fuel gas supplying and filling systems 1 and 1A to 1E for fuel gas consuming units (hereinafter simply referred to as "fuel gas supplying and filling systems") according to Embodiments 1 to 6 of the present invention will be explained in reference to the drawings. Each of the fuel gas supplying and filling systems 1 and 1A to 1E explained below is just one embodiment of the present invention, and the present invention is not limited to the embodiments. Additions, eliminations, and modifications may be made within the spirit of the present invention.

Embodiment 1

A vehicle, such as a compressed natural gas automobile, a hydrogen gas automobile, or a fuel-cell automobile, includes a fuel gas consuming unit (such as a gas engine or a fuel cell) 2, a high-pressure tank 3, and a fuel supply system 1. The fuel gas consuming unit 2 consumes a fuel gas (such as a compressed natural gas (CNG) or a hydrogen gas) to generate a driving force, thereby causing driving wheels to move. The fuel gas consuming unit 2 is connected to the high-pressure tank 3 through the fuel supply system 1. The high-pressure tank 3 can store a high-pressure fuel gas of for example, 35 to 70 MPa or higher. The fuel gas supplying and filling system 1 supplies the fuel gas, stored in the high-pressure tank 3, to the fuel gas consuming unit 2.

Hereinafter, the configuration of the fuel gas supplying and filling system 1 will be explained. The fuel gas supplying and filling system 1 includes a supply system configured to supply the fuel gas to the fuel gas consuming unit 2 and a fill system configured to fill the high-pressure tank 3 with the fuel gas. Hereinafter, first, the supply system will be explained, and the fill system will be explained thereafter.

Supply System

The fuel gas supplying and filling system 1 supplies the fuel gas to the fuel gas consuming unit 2 in accordance with an input of an input unit, not shown, such as an accelerator pedal. The fuel gas supplying and filling system 1 includes a supply passage 4, an electromagnetic pressure regulating valve 6, an electromagnetic on-off valve 7, a safety relief valve 8, a low-pressure-side pressure sensor 9, and a controller 10. The supply passage 4 is a passage through which the fuel gas flows, and one end thereof is connected to the high-pressure tank 3.

The electromagnetic pressure regulating valve 6 is provided on the supply passage 4. The electromagnetic pressure regulating valve 6 regulates the pressure of the high-pressure fuel gas, flowing out from the high-pressure tank 3, to low pressure to supply the fuel gas to the fuel gas consuming unit 2. Although the specific configuration of the electromagnetic pressure regulating valve 6 will be described later, the electromagnetic pressure regulating valve 6 is a normally closed valve and shuts off the supply passage 4 by stopping a current flowing therethrough. The electromagnetic on-off valve 7 is located upstream of the electromagnetic pressure regulating valve 6. The electromagnetic on-off valve 7 is provided on the supply passage 4 and opens and closes the supply passage 4. When a manipulating unit, not shown, is manipulated, the electromagnetic on-off valve 7 opens or closes the supply passage 4. When the pressure downstream of the electromagnetic pressure regulating valve 6 becomes allowable pressure (for example, pressure higher than normal pressure and lower than withstand pressure of the fuel gas consuming unit 2), the electromagnetic on-off valve 7 shuts off the supply passage 4 by shutting off the current flowing from an on-off valve control portion 10b of the controller 10 described below. As above, since two valves 6 and 7 each having the shutoff function are provided on the supply passage 4, the redundancy of the shutoff function of the fuel gas supplying and filling system 1 is realized. With this, the shutoff performance of the supply passage 4 can be improved, and the safety of the fuel gas supplying and filling system 1 can be improved.

The electromagnetic on-off valve 7 and the electromagnetic pressure regulating valve 6 provided on the supply passage 4 as above are provided at an opening portion of the high-pressure tank 3. The electromagnetic on-off valve 7 and the electromagnetic pressure regulating valve 6 are formed integrally with a valve block 11 configured to close the opening portion. These two valves 6 and 7 constitute a container main valve 12. The container main valve 12 is constituted as an electromagnetic container main valve including these two valves 6 and 7 as in tank type or on tank type electromagnetic valves. By including the electromagnetic pressure regulating valve 6 in the container main valve 12 as above, the output pressure level from the high-pressure tank 3 can be reduced to low pressure. Thus, the safety of the fuel gas supplying and filling system 1 significantly improves. In addition, by including the electromagnetic on-off valve 7 in the container main valve 12, it becomes unnecessary to additionally provide a manual shutoff valve at the high-pressure tank 3. Thus, the number of parts can be reduced. Further, since the electromagnetic on-off valve 7 can be remotely manipulated by a current, the high-pressure tank 3 can be urgently shut off during, for example, an emergency. Thus, the safety of the fuel gas supplying and filling system 1 can be improved.

Further, the safety relief valve 8 and the low-pressure-side pressure sensor 9 are connected to the supply passage 4 so as to be located between the electromagnetic pressure regulating valve 6 and the fuel gas consuming unit 2 and provided in this order from the upstream side. The safety relief valve 8 is a so-called relief valve and provided in the valve block 11. The safety relief valve 8 operates when the pressure downstream of the electromagnetic pressure regulating valve 6 becomes higher than predetermined limit pressure. The low-pressure-side pressure sensor 9 detects the pressure downstream of the electromagnetic pressure regulating valve 6, that is, pressure of a low-pressure side of the supply passage 4. The low-pressure-side pressure sensor 9 is electrically connected to the controller 10 and transmits detected pressure to the controller 10.

The controller 10 that is a control unit includes a pressure regulating valve control portion 10a and the on-off valve control portion 10b. The pressure regulating valve control portion 10a is connected to an ECU and the low-pressure-side pressure sensor 9. The pressure regulating valve control portion 10a receives from the ECU target pressure determined depending on an input amount of an input unit included in a vehicle, such as an opening degree (step-on amount) of an accelerator pedal. The pressure regulating valve control portion 10a adjusts a current, supplied to the electromagnetic pressure regulating valve 6, to control the pressure of the gas flowing to the fuel gas consuming unit 2. More specifically, the pressure regulating valve control portion 10a adjusts the current, supplied to the electromagnetic pressure regulating valve 6, based on the target pressure and the detected pressure of the low-pressure-side pressure sensor 9, that is, performs feedback control in which the pressure of the gas flowing to the fuel gas consuming unit 2 is adjusted such that the detected pressure becomes the target pressure.

The low-pressure-side pressure sensor 9 configured to perform a part of the feedback control may be provided at any position as long as it is located downstream of the safety relief valve 8. However, it is preferable that the low-pressure-side pressure sensor 9 be provided on the supply passage 4 so as to be close to the fuel gas consuming unit 2 (it is desirable that the low-pressure-side pressure sensor 9 be provided as close to the fuel consuming unit 2 as possible). In the fuel gas supplying and filling system 1, the controller 10 adjusts the current, supplied to the electromagnetic pressure regulating valve 6, such that the pressure detected by the low-pressure-side pressure sensor 9 becomes the target pressure regardless of the fuel gas pressure loss caused in the supply passage 4 and various devices provided on the supply passage 4. Therefore, by providing the low-pressure-side pressure sensor 9 close to the fuel gas consuming unit 2, the fuel gas of pressure closer to the target pressure can be supplied to the fuel gas consuming unit 2. On this account, the degree of freedom of the length of the supply passage 4, the configurations of the devices provided on the supply passage 4, and the like increases. Thus, the degree of freedom of the design of the fuel gas supplying and filling system 1 improves.

Further, the pressure regulating valve control portion 10a is electrically connected to the electromagnetic pressure regulating valve 6. When the pressure detected by the low-pressure-side pressure sensor 9 exceeds the allowable pressure of the fuel gas consuming unit 2, the pressure regulating valve control portion 10a activates the electromagnetic pressure regulating valve 6 to shut off the supply passage 4.

The on-off valve control portion 10b is connected to the ECU and the low-pressure-side pressure sensor 9. Further, the on-off valve control portion 10b is electrically connected to the electromagnetic on-off valve 7 and controls open and close operations of the electromagnetic on-off valve 7. The on-off valve control portion 10b closes the supply passage 4 in accordance with a command from the ECU. In a case where the pressure detected by the low-pressure-side pressure sensor 9 exceeds the allowable pressure of the fuel gas consuming unit 2, the on-off valve control portion 10b causes the electromagnetic on-off valve 7 and the electromagnetic pressure regulating valve 6 to shut off the supply passage 4. Thus, the fuel gas supplying and filling system 1 is configured as a safer system.

Further, the safety of the fuel gas supplying and filling system 1 further improves by including a control operation of shutting off the electromagnetic on-off valve 7 when a high-pressure-side pressure sensor 54 detects a rapid pressure drop to detect the leakage of the fuel gas or when the leakage is detected by a leakage detection sensor, not shown.

Electromagnetic Pressure Regulating Valve

Hereinafter, the configuration of the electromagnetic pressure regulating valve 6 provided in the fuel gas supplying and filling system 1 will be explained in detail. In the following explanations, the concept of directions, such as upper, lower, left, right, front, and rear directions, is used for convenience of explanation and does not indicate that the arrangements, directions, and the like of components of the electromagnetic pressure regulating valve 6 are limited to such directions. In addition, the electromagnetic pressure regulating valve 6 explained below is just one embodiment of the electromagnetic pressure regulating valve, and the present invention is not limited to the embodiments below. Additions, eliminations, and modifications may be made within the spirit of the present invention.

Figure 2:
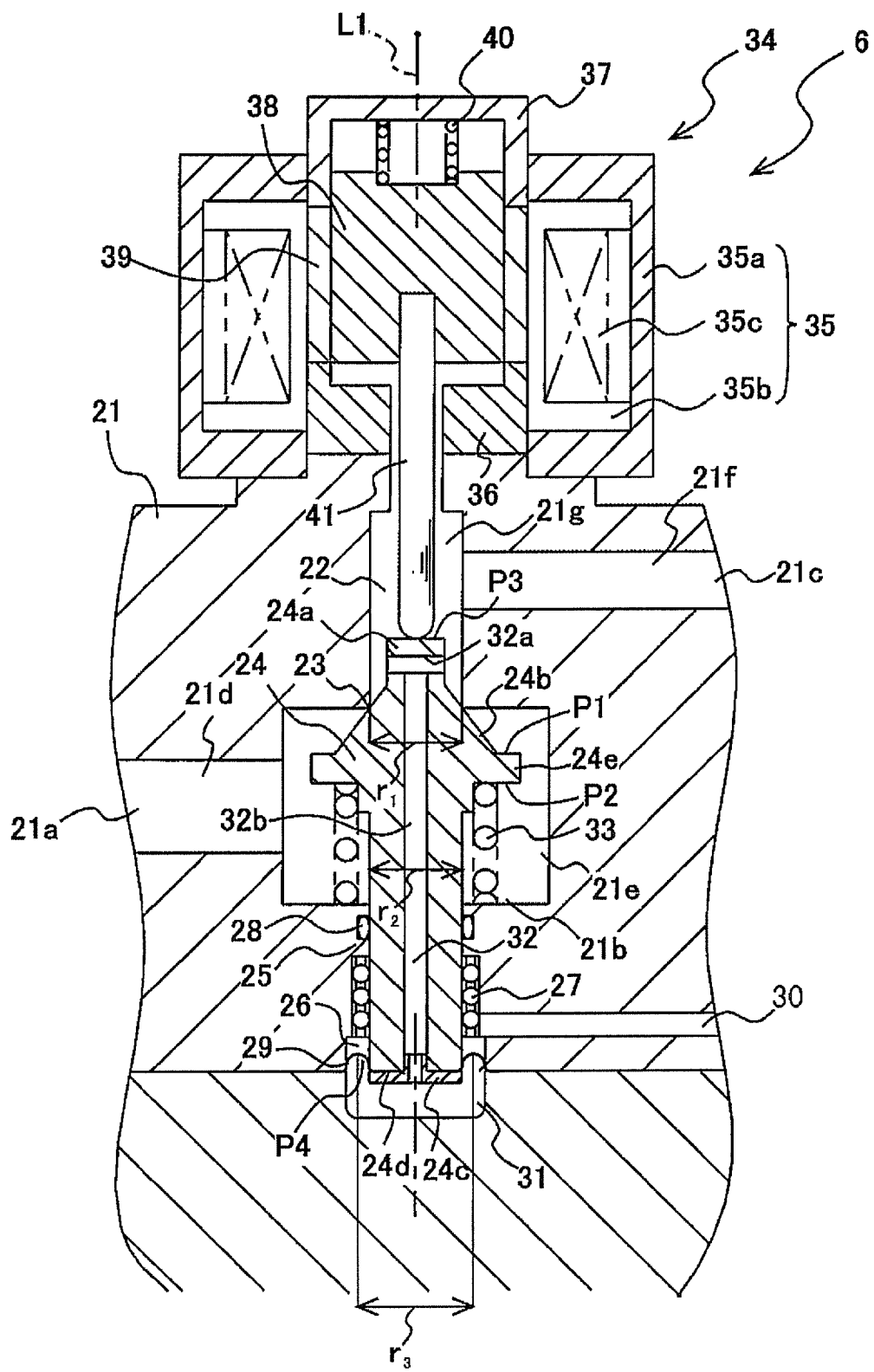
FIG. 2 is a cross-sectional view showing the configuration of an electromagnetic pressure regulating valve included in the fuel gas supplying and filling system of Embodiment 1.

As shown in FIG. 2, the electromagnetic pressure regulating valve 6 includes a housing 21. A primary port 21a, a valve body hole 21b, and a secondary port 21c are formed on the housing 21. The primary port 21a is connected to the electromagnetic on-off valve 7 (see FIG. 1) and also connected to the valve body hole 21b through a primary side passage 21d formed on the housing 21.

The valve body hole 21b extends along an axis line L1 extending in the upper-lower direction and has a circular cross section. The valve body hole 21b includes a valve space 21e at an intermediate portion thereof, the valve space 21e being larger in diameter than the other portion of the valve body hole 21b. The primary side passage 21d is connected to the valve space 21e. The valve body hole 21b is connected to a secondary side passage 21f at a secondary side region 21g located above the valve space 21e. The secondary side passage 21f is formed in the housing 21, and the valve body hole 21b is connected to the secondary port 21c through the secondary side passage 21f. The secondary port 21c is connected to the fuel gas consuming unit 2 through the supply passage 4 (see FIG. 1). As above, the primary port 21a and the secondary port 21c are connected to each other through the primary side passage 21d, the valve space 21e, the secondary side region 21g, and the secondary side passage 21f. The primary side passage 21d, the valve space 21e, the secondary side region 21g, and the secondary side passage 21f constitute a valve passage 22 configured to connect the primary port 21a and the secondary port 21c.

The housing 21 includes a seat portion 23. The seat portion 23 is located in the vicinity of an opening connecting the secondary side region 21g and the valve space 21e and is formed to surround this opening. A valve body 24 is inserted in the valve body hole 21b of the housing 21 so as to be seated (pressed) on the seat portion 23. The valve body 24 is located along the axis line L1 of the valve body hole 21b, and a tip end portion (to be specific, an upper end portion) 24a thereof is located at the secondary side region 21g. The valve body 24 has a substantially columnar shape and includes a tapered portion 24b located on the tip end portion 24a side. The tapered portion 24b has a tapered shape toward an upper side. When the valve body 24 is located at a closed position as shown in FIG. 2, the valve body 24 is seated on the seat portion 23 to close the valve passage 22.

Further, the housing 21 includes a seal attaching portion 25 located below the valve space 21e. The seal attaching portion 25 is formed on an inner peripheral surface of the housing 21 so as to project toward the valve body hole 21b and is formed on the inner peripheral surface along the entire periphery in a circumferential direction. The seal attaching portion 25 is formed in an annular shape, and an inner diameter thereof is substantially equal to each of a hole diameter of the secondary side region 21g and an outer diameter of the valve body 24 (an outer diameter of a portion of the valve body 24, the portion being located closer to a lower end 24d than the tapered portion 24b). An inner diameter of a portion of the housing 21 located below the seal attaching portion 25 is larger than the inner diameter of the seal attaching portion 25. With this, a bearing member accommodating space 26 having a substantially annular shape is formed between the housing 21 and the valve body 24. A bearing member 27 is accommodated in the bearing member accommodating space 26.

The bearing member 27 is formed to have a substantially cylindrical shape and is constituted by a ball guide, a ball bearing, a slide bearing, or the like. The bearing member 27 is externally attached to the valve body 24, interposed between the valve body 24 and the housing 21, and supports the valve body 24. With this, the valve body 24 can move smoothly in the housing 21 along the axis line L1 in the upper-lower direction. In order to further smoothen the movement of the valve body 24 and improve the durability of the bearing member 27, the bearing member 27 is lubricated with grease.

In order to seal the bearing member accommodating space 26, a high-pressure sealing member 28 is provided on an upper side of the bearing member accommodating space 26 in which the bearing member 27 is provided as above. The high-pressure sealing member 28 is attached so as to be fitted in an inner peripheral portion of the seal attaching portion 25 and is provided on an outer periphery of the valve body 24. The high-pressure sealing member 28 provided as above seals a gap between the valve body 24 and the seal attaching portion 25.

In addition, in order to seal the bearing member accommodating space 26, a diaphragm seal 29 is provided on a lower side of the bearing member accommodating space 26. The diaphragm seal 29 that is a second sealing member is a diaphragm formed in a substantially annular shape and is provided on an outer periphery of the valve body 24. An inner edge portion of the diaphragm seal 29 is attached to the valve body 24, and an outer edge portion thereof is attached to the housing 21. More specifically, the inner edge portion of the diaphragm seal 29 is attached to the valve body 24 so as to be sandwiched between the lower end 24d of the valve body 24 and an attaching member 24c attached to the lower end 24d. Here, the housing 21 is configured to be separable into two parts that are upper and low portions, and the outer edge portion of the diaphragm seal 29 is attached to the housing 21 so as to be sandwiched between these two parts.

As above, the upper and lower sides of the bearing member 27 are sealed by two sealing members 28 and 29. With this, the bearing member accommodating space 26 is shut off and separated from other spaces (for example, the valve space 21e and the secondary side region 21g) formed in the housing 21. Therefore, the bearing member 27 is not exposed to the fuel gas. On this account, a material having no corrosion resistance to the fuel gas can be used as a material of the bearing member, and this increases material options of the bearing member.

In addition, the grease for lubricating the bearing member 27 is not exposed to the fuel gas and does not leak to the other space, such as the valve space 21e or the secondary port 21c, in the housing 21. Therefore, the grease can be prevented from being mixed with the fuel gas, and influences on downstream devices by the leakage of the grease can be avoided. In addition, the grease can be prevented from drying up, and a good lubrication state of the bearing member 27 can be maintained. With this, the durability of the bearing member 27 can be improved, and the valve body 24 can be moved smoothly. Although the bearing member accommodating space 26 is separated from the other spaces, and the grease does not leak from the bearing member accommodating space 26 to the other spaces, the bearing member accommodating space 26 is connected to an atmosphere communication passage 30 formed in the housing 21 and is open to the atmosphere through the atmosphere communication passage 30. The grease can be supplied through the atmosphere communication passage 30.

A pressure return chamber 31 is formed at a portion of the valve body hole 21b, the portion being located on a lower side of the diaphragm seal 29. The pressure return chamber 31 is a substantially disc-shaped space surrounded by a bottom portion of the housing 21 and the diaphragm seal 29. The lower end 24d of the valve body 24 is located in the pressure return chamber 31 formed in the housing 21 as above. The diaphragm seal 29 seals between the pressure return chamber 31 and the bearing member accommodating space 26. The pressure return chamber 31 is connected to the secondary side passage 21f through a pressure equalizing passage 32 formed in the valve body 24.

The pressure equalizing passage 32 includes a secondary side communication portion 32a and a communication portion 32b. The secondary side communication portion 32a extends so as to penetrate the tip end portion 24a of the valve body 24 in a radial direction of the valve body 24, and both ends thereof are open to the secondary side region 21g. The communication portion 32b is connected to the secondary side communication portion 32a. The communication portion 32b is formed along an axis (which substantially coincides with the axis line L1 in the present embodiment) of the valve body 24. An upper end of the communication portion 32b is connected to the secondary side communication portion 32a, and a lower end thereof is connected to the pressure return chamber 31. Therefore, the secondary port 21c and the pressure return chamber 31 are connected to each other through the pressure equalizing passage 32, and secondary pressure $p_2$ introduced to the secondary port 21c is introduced to the pressure return chamber 31 through the pressure equalizing passage 32.

The valve body 24 includes a flange 24e. The flange 24e is formed below the tapered portion 24b along the entire periphery of the valve body 24 in the circumferential direction and projects further from the tapered portion 24b in a radially outward direction. The flange 24e is located so as to be opposed to an upper end of the seal attaching portion 25. A return spring 33 is provided between the flange 24e and the upper end of the seal attaching portion 25. The return spring 33 is a so-called compression coil spring, is externally attached to the valve body 24 in a compressed state, and biases the valve body 24 in a direction toward the closed position (in such a direction that the valve body 24 moves toward the closed position). The biased valve body 24 is seated on the seat portion 23 to close the valve passage 22. An electromagnetic proportional solenoid 34 is provided at an opening end portion (that is, an upper end portion) of the housing 21 in order to apply to the valve body 24 a force against the biasing of the return spring 33.

The electromagnetic proportional solenoid 34 that is an exciting unit is threadedly engaged with and fixed to an outer periphery of the opening end portion of the housing 21. The electromagnetic proportional solenoid 34 includes a solenoid coil 35. The solenoid coil 35 is formed to have a substantially cylindrical shape, and the housing 21 is threadedly engaged with a lower end side of the solenoid coil 35. The solenoid coil 35 includes a substantially cylindrical case 35a, and a bobbin 35b and a coil wire 35c are provided in the case 35a. The bobbin 35b is formed to also have a substantially cylindrical shape. The solenoid coil 35 is constituted by winding the coil wire 35c around the bobbin 35b. The coil wire 35c is electrically connected to the pressure regulating valve control portion 10a of the controller 10. A yoke 36 is provided in the solenoid coil 35 so as to be located at a lower end portion of the solenoid coil 35, and an upper end portion of the solenoid coil 35 is closed by a cover 37. A movable member 38 is provided between the yoke 36 and the cover 37.

The movable member 38 is made of a magnetic material and is formed to have a substantially columnar shape. The movable member 38 is provided along the axis line L1. An outer diameter of the movable member 38 is smaller than an inner diameter of the solenoid coil 35. A guide member 39 having an annular shape is interposed between the movable member 38 and the solenoid coil 35. The guide member 39 is made of a non-magnetic material and supports the movable member 38 such that the movable member 38 can slide along the axis line L1 in the upper-lower direction. The yoke 36 is opposed to a lower end portion of the movable member 38 in the upper-lower direction so as to be spaced apart from the lower end portion of the movable member 38. The yoke 36 is made of a magnetic material and is formed to have a substantially annular shape. The yoke 36 and the movable member 38 are magnetized by supplying a current to the solenoid coil 35, and the yoke 36 attracts the movable member 38.

A compression coil spring 40 is provided between an upper end portion of the movable member 38 and the cover 37. The movable member 38 is being biased toward the valve body 24 by the compression coil spring 40. A pushing member 41 is provided at the lower end portion of the movable member 38. The pushing member 41 extends along the axis line L1 and is inserted through the yoke 36. A base end portion of the pushing member 41 is fixed to the movable member 38. A tip end of the pushing member 41 is formed to have a partially spherical shape and contacts the tip end portion 24a of the valve body 24. The pushing member 41 is biased by the compression coil spring 40 via the movable member 38, and the tip end thereof is pressed on the tip end portion 24a of the valve body 24. Therefore, by supplying the current to the solenoid coil 35, the movable member 38 is attracted toward the yoke 36, and the pushing member 41 pushes the valve body 24 in a direction toward an open position by a force corresponding to the supplied current. Thus, the valve passage 22 opens.

In the electromagnetic pressure regulating valve 6 configured as above, the tapered portion 24b of the valve body 24 and an upper surface of the flange 24e (that is, a pressure receiving surface P1 corresponding to a first pressure receiving surface) receive primary pressure $p_1$, having been introduced from the high-pressure tank 3 to the valve space 21e, in the direction toward the open position, and a lower surface of the flange 24e (that is, a pressure receiving surface P2 corresponding to a second pressure receiving surface) receives the primary pressure $p_1$ in the direction toward the closed position. The pressure receiving surface P1 is a partial region of the tapered surface, the region being located on a radially outer side of the secondary side region 21g in plan view. The primary pressure $p_1$ applied to the pressure receiving surface P1 and the primary pressure $p_1$ applied to the pressure receiving surface P2 respectively act in directions opposite to each other and cancel each other. The pressure receiving areas of the pressure receiving surfaces P1 and P2 are substantially equal to each other since an outer diameter of a portion of the valve body 24 and the inner diameter (to be specific, a seat diameter) of the secondary side region 21g are substantially equal to each other, the portion being located on the lower end 24d side of the flange 24e. Therefore, an acting force generated by the primary pressure $p_1$ received by the pressure receiving surface P1 and an acting force generated by the primary pressure $p_1$ received by the pressure receiving surface P2 cancel each other, so that influences due to the fluctuation in the primary pressure $p_1$ on the valve body 24 can be prevented.

In the electromagnetic pressure regulating valve 6, a tip end of the valve body 24 and a tapered surface of the tapered portion 24b (that is, a pressure receiving surface P3) receive in the direction toward the open position the secondary pressure $p_2$ flowing in the secondary side region 21g, and the diaphragm seal 29 and the lower end 24d of the valve body 24 (that is, a pressure receiving surface P4) receive in the direction toward the closed position the secondary pressure $p_2$ introduced to the pressure return chamber 31. The pressure receiving surface P3 is a region overlapping the secondary side region 21g in plan view. The secondary pressure $p_2$ applied to the pressure receiving surface P3 and the secondary pressure $p_2$ applied to the pressure receiving surface P4 respectively act in directions opposite to each other.

The pressure receiving area of the pressure receiving surface P3 is determined depending on the seat diameter $r_1$, and the pressure receiving area of the pressure receiving surface P4 is determined depending on an effective diameter $r_3$ of the diaphragm seal 29. The seat diameter $r_1$ is substantially equal to the outer diameter $r_2$ of the valve body 24, and the effective diameter $r_3$ of the diaphragm seal 29 is larger than each of the seat diameter $r_1$ and the outer diameter $r_2$ of the valve body 24. Therefore, the pressure receiving area of the pressure receiving surface P4 is larger than that of the pressure receiving surface P3. With this, an acting force generated by the secondary pressure $p_2$ received by the pressure receiving surface P3 and an acting force generated by the secondary pressure $p_2$ received by the pressure receiving surface P4 do not completely cancel each other, and an acting force corresponding to the difference between the pressure receiving areas of the pressure receiving surfaces P3 and P4 acts on the valve body 24 in the direction toward the closed position.

In addition to these acting forces, the valve body 24 is biased by the return spring 33 in the direction toward the closed position. Therefore, the electromagnetic pressure regulating valve 6 is configured such that the valve body 24 is seated on the seat portion 23 in a state where the current to the solenoid coil 35 is shut off. Thus, the electromagnetic pressure regulating valve 6 is configured as a more reliable normally closed valve. The electromagnetic pressure regulating valve 6 configured as above is utilized as a shutoff valve. When the detected pressure of the low-pressure-side pressure sensor 9 becomes allowable pressure or higher, the pressure regulating valve control portion 10a of the controller 10 shut off the current supplied to the solenoid coil 35 to cause the electromagnetic pressure regulating valve 6 to urgently shut off the valve passage 22. With this, for example, even if the fuel gas of unintended high pressure is supplied to the fuel gas consuming unit 2, the supply passage 4 can be immediately shut off, and the fuel gas consuming unit 2 can be prevented from being damaged.

Since the electromagnetic pressure regulating valve 6 has the shutoff function, the number of shutoff valves provided on the supply passage 4 can be reduced. Thus, the number of components of the fuel gas supplying and filling system 1 can be reduced, and the manufacturing cost of the fuel gas supplying and filling system 1 can be reduced. In addition, by reducing the number of shutoff valves, the pressure loss in the fuel gas supplying and filling system 1 can be reduced. With this, the service pressure limit of the high-pressure tank 3 can be lowered, and the cruising distance of the automobile can be increased significantly. Further, by reducing the number of shutoff valves, the fuel gas supplying and filling system 1 can be reduced in size.

Operations of Electromagnetic Pressure Regulating Valve

Hereinafter, operations of the electromagnetic pressure regulating valve 6 will be explained in reference to FIG. 2. First, the pressure regulating valve control portion 10a of the controller 10 supplies to the solenoid coil 35 a current corresponding to the target pressure transmitted from the ECU to the pressure regulating valve control portion 10a of the controller 10. With this, the magnetizing force acts on the movable member 38, and the movable member 38 is attracted toward the yoke 36. Therefore, the valve body 24 is pushed by the pushing member 41 in the direction toward the open position to be separated from the seat portion 23. Thus, the valve passage 22 opens, and the fuel gas in the valve space 21e flows toward the secondary side region 21g. At this time, the pressure of the fuel gas flowing from the valve space 21e to the secondary side region 21g is reduced to the secondary pressure $p_2$ by an orifice (not shown) formed between the valve body 24 and the seat portion 23.

The fuel gas of the secondary pressure $p_2$ flows through the secondary side passage 21f to be output through the secondary port 21c, and a part of the fuel gas flows through the pressure equalizing passage 32 to be introduced to the pressure return chamber 31. The diaphragm seal 29 receives the secondary pressure $p_2$ of the fuel gas introduced to the pressure return chamber 31. The valve body 24 moves up to a position where the magnetizing force received by the movable member 38, the acting force generated by the secondary pressure $p_2$ received by the pressure receiving surface P3, the acting force generated by the secondary pressure $p_2$ received by the pressure receiving surface P4, and the spring force of the return spring 33 are balanced. In order to balance the above forces, the opening degree of the valve passage 22 (to be specific, the opening degree of the orifice) is adjusted. With this, even if the secondary pressure $p_2$ fluctuates, the opening degree of the valve passage 22 is adjusted, and the secondary pressure $p_2$ is returned to the target pressure. Therefore, the secondary pressure $p_2$ is maintained at the target pressure.

More specifically, for example, in a case where the secondary pressure $p_2$ is lower than the target pressure, the magnetizing force becomes larger than the acting force generated by the secondary pressure $p_2$. Thus, the valve body 24 moves in the direction toward the open position so as to be separated from the seat portion 23. Therefore, the opening degree of the valve passage 22 increases, and this increases the secondary pressure $p_2$. On this account, the valve body 24 moves up to a position where the acting force generated by the secondary pressure $p_2$, the magnetizing force, and the spring force of the return spring 33 are balanced, that is, a position where the secondary pressure $p_2$ becomes the target pressure. Thus, the secondary pressure $p_2$ is returned to the target pressure. As above, even if the primary pressure $p_1$ or the secondary pressure $p_2$ fluctuates, the electromagnetic pressure regulating valve 6 can control the opening degree of the valve passage 22 in accordance with the fluctuation in the primary pressure $p_1$ or the secondary pressure $p_2$ to regulate the secondary pressure $p_2$ to the target pressure. Therefore, the electromagnetic pressure regulating valve 6 is high in pressure controllability and can more precisely regulate the pressure of the high-pressure fuel gas to the target pressure. In a case where the secondary pressure $p_2$ is higher than the target pressure, the valve body 24 moves in an opposite manner as above, that is, moves toward the close direction such that the secondary pressure $p_2$ is returned to the target pressure.

In the electromagnetic pressure regulating valve 6 configured to operate as above, the valve body 24 is supported by the bearing member 27 so as to be movable smoothly. Therefore, even if the secondary pressure $p_2$ fluctuates, the valve body 24 moves quickly such that the secondary pressure $p_2$ is returned to the target pressure. On this account, the followability of the electromagnetic pressure regulating valve 6 with respect to the target pressure can be improved. With this, the fluctuation range of the secondary pressure $p_2$ can be reduced.

Operation of Supplying Fuel Gas

Hereinafter, an operation of supplying the fuel gas in the fuel gas supplying and filling system 1 will be explained in reference to FIG. 1. In the fuel gas supplying and filling system 1, the on-off valve control portion 10b activates the electromagnetic on-off valve 7 by, for example, a command of the ECU to open the supply passage 4, and the fuel gas in the high-pressure tank 3 is supplied to the electromagnetic pressure regulating valve 6. The pressure of the supplied fuel gas is regulated to the target pressure by the electromagnetic pressure regulating valve 6 as described above. Then, the fuel gas flows through the supply passage 4 to be introduced to the fuel gas consuming unit 2. At this time, the pressure of the fuel gas is detected by the low-pressure-side pressure sensor 9, and the detection result is transmitted to the controller 10.

The pressure regulating valve control portion 10a of the controller 10 compares the pressure of the fuel gas detected by the low-pressure-side pressure sensor 9 (to be specific, detected pressure) and the target pressure. In a case where the detected pressure is lower than the target pressure, to eliminate the difference between the detected pressure and the target pressure, the current supplied to the electromagnetic pressure regulating valve 6 is increased to increase the opening degree of the valve passage 22, thereby increasing the secondary pressure $p_2$ of the electromagnetic pressure regulating valve 6. Then, when the detected pressure reaches the target pressure, the current supplied to the electromagnetic pressure regulating valve 6 is maintained to maintain the opening degree of the valve passage 22. In a case where the detected pressure is higher than the target pressure since the current supplied to the electromagnetic pressure regulating valve 6 is increased too much, to eliminate the difference between the detected pressure and the target pressure, the current supplied to the electromagnetic pressure regulating valve 6 is decreased to decrease the opening degree of the valve passage 22, thereby decreasing the secondary pressure $p_2$.

As above, the pressure regulating valve control portion 10a adjusts the secondary pressure $p_2$ output from the electromagnetic pressure regulating valve 6, that is, performs the feedback control such that the pressure (to be specific, supply pressure) of the fuel gas introduced to the fuel gas consuming unit 2 becomes the constant target pressure. Thus, the supply pressure can be maintained at the target pressure. With this, the supply pressure can be controlled with a high degree of accuracy and can be maintained at more stable constant pressure. In addition, the fuel gas of the mass flow rate which is highly accurate with respect to the command from the ECU can be supplied to the fuel gas consuming unit 2.

In the electromagnetic pressure regulating valve 6 configured as above, since the pressure receiving areas of the pressure receiving surfaces P1 and P2 are substantially equal to each other, the acting forces generated by the primary pressure $p_1$ received by the valve body 24 cancel each other. With this, even if the primary pressure $p_1$ fluctuates by, for example, the reduction in the remaining amount of fuel gas in the high-pressure tank 3, the fluctuation in the acting force applied to the valve body due to the fluctuation in the primary pressure $p_1$ can be suppressed. Therefore, the pressure controllability with respect to the high-pressure fuel gas can be improved, and the secondary pressure $p_2$ can be controlled more precisely. In addition, by canceling the acting forces generated by the primary pressure $p_1$, the magnetizing force of the electromagnetic proportional solenoid 34 can be reduced, and therefore the electromagnetic pressure regulating valve 6 can be reduced in size. The pressure receiving areas of the pressure receiving surfaces P1 and P2 do not have to be substantially equal to each other. Since the above-described feedback control is being performed, the supply pressure can be stably maintained at the target pressure with a high degree of accuracy even if the pressure receiving areas are different from each other.

Fill System

Next, the fill system included in the fuel gas supplying and filling system 1 will be explained. The fill system is a circuit capable of filling the high-pressure tank 3 with the high-pressure fuel gas. To configure the fill system, the fuel gas supplying and filling system 1 includes a fill passage 51, a filter 52, a check valve 53, and the high-pressure-side pressure sensor 54 as shown in FIG. 1. The fill passage 51 is formed in the valve block 11, and one end thereof is connected to a portion of the supply passage 4, the portion being located between the electromagnetic on-off valve 7 and the electromagnetic pressure regulating valve 6. In addition, a filling opening 55 is formed at the other end of the fill passage 51. The high-pressure fuel gas can be supplied through the filling opening 55.

Further, the filter 52 and the check valve 53 are provided on the fill passage 51 in this order from the filling opening 55 side. The filter 52 removes impurities contained in the fuel gas supplied through the filling opening 55. The check valve 53 is configured to open to allow the flow of the gas through the filling opening 55 toward the supply passage 4 and close to block the opposite flow of the gas. The high-pressure-side pressure sensor 54 is connected to a portion of the supply passage 4, the portion being located between the electromagnetic on-off valve 7 and the electromagnetic pressure regulating valve 6. The high-pressure-side pressure sensor 54 is connected to the on-off valve control portion 10b of the controller 10. The high-pressure-side pressure sensor 54 detects the pressure of the fuel gas existing between the electromagnetic on-off valve 7 and the electromagnetic pressure regulating valve 6 and transmits the detection result to the on-off valve control portion 10b.

In addition to the above-described shutoff function, the electromagnetic on-off valve 7 has a non-return function, that is, a function of, when the high-pressure fuel gas is supplied to a downstream side of the electromagnetic on-off valve 7 at the time of the shutoff of the electromagnetic on-off valve 7, opening the supply passage 4 to allow the flow of the gas from the downstream side of the electromagnetic on-off valve 7 into the high-pressure tank 3. With this, the electromagnetic on-off valve 7 is configured as a bidirectional flow on-off valve configured to allow the flow of the gas from the high-pressure tank 3 to the electromagnetic pressure regulating valve 6 and also allow the opposite flow of the gas.

Filling Operation

The fuel gas supplying and filling system 1 including the fill system can fill the high-pressure tank 3 with the high-pressure fuel gas by using this fill system. Hereinafter, a filling operation will be explained. In the fuel gas supplying and filling system 1, the fuel gas is supplied through the filling opening 55 of the fill passage 51, and the fuel gas flows through the filter 52 to be introduced to the check valve 53. The introduced fuel gas activates the check valve 53 to open the fill passage 51. Further, the fuel gas flows into and through the supply passage 4 to reach the electromagnetic on-off valve 7 and the electromagnetic pressure regulating valve 6.

After the fuel gas reaches the electromagnetic on-off valve 7, the fuel gas opens the supply passage 4, which has been closed by the electromagnetic on-off valve 7. Then, the fuel gas flows into the high-pressure tank 3. With this, the high-pressure fuel gas is filled in the high-pressure tank 3. Thus, tank pressure in the high-pressure tank 3 increases. When a difference between the pressure of the fuel gas supplied through the filling opening 55 and the tank pressure in the high-pressure tank 3 becomes small, the supply passage 4 is closed by the electromagnetic on-off valve 7. With this, the filling operation of the fuel gas is completed.

As described above, the electromagnetic pressure regulating valve 6 is a normally closed pressure regulating valve. Therefore, when the fuel gas consuming unit 2 is in a stop state, the current flowing through the electromagnetic proportional solenoid 34 is shut off, so that the valve passage 22 is being closed. Therefore, in the case of supplying the fuel gas when the fuel gas consuming unit 2 is in the stop state, the fuel gas supplied through the filling opening 55 does not flow through the electromagnetic pressure regulating valve 6, so that the fuel gas is not introduced to the fuel gas consuming unit 2. On this account, during the filling operation, the fuel gas consuming unit 2 is not damaged by the high-pressure fuel gas introduced to the fuel gas consuming unit 2. Thus, the supply passage 4 can be used in both the supplying and filling operations of the fuel gas. As above, by using the bidirectional electromagnetic on-off valve 7, the normally closed electromagnetic pressure regulating valve 6, and the supply passage 4, the number of components, especially the number of valves, can be reduced, and the size and cost of the fuel gas supplying and filling system 1 including the fill system can be reduced.

By using the supply passage 4 in both the supplying and filling operations of the fuel gas, the number of passages and components can be reduced. With this, man-hours for connections of pipes constituting the passages can be reduced significantly, and the risk of mistakes, such as improper connections and connection forgetting, in the pipework can be reduced.

Leakage Detection

Figure 3:
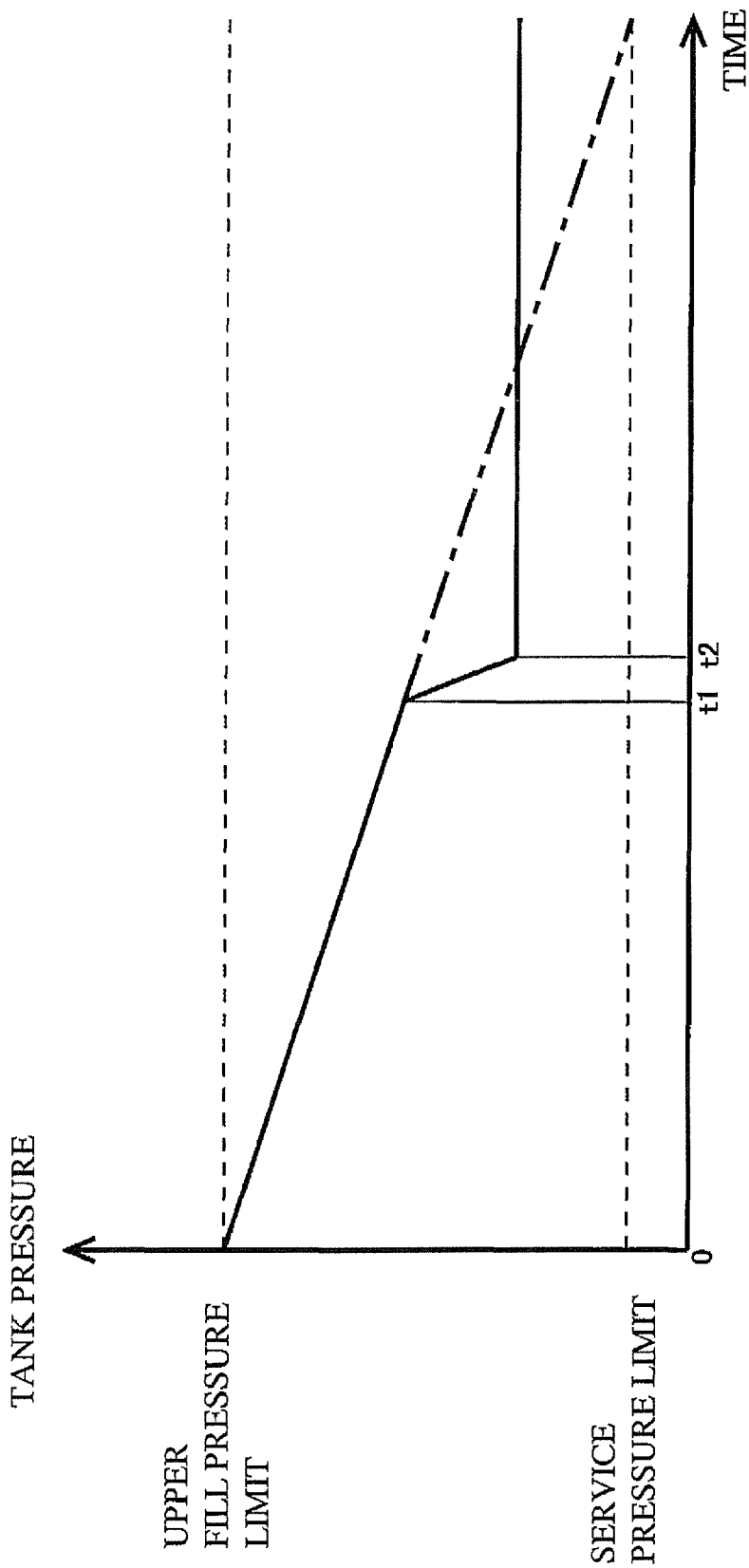
FIG. 3 is a graph showing a time-lapse change of detected pressure of a high-pressure-side pressure sensor in a case where the supplying and filling system is continuously used and a case where leakage has occurred.

In the fuel gas supplying and filling system 1, the leakage of the fuel gas is detected based on the detection result of the high-pressure-side pressure sensor 54. Specifically, in a case where the fuel gas is discharged through the fill passage 51 to the atmosphere when the electromagnetic on-off valve 7 is in a closed state, the pressure of the gas existing between the electromagnetic on-off valve 7 and the electromagnetic pressure regulating valve 6 rapidly decreases as shown in FIG. 3 (see times t1 to t2) as compared to a case where the leakage is not occurring (see a dashed line in FIG. 3). The high-pressure-side pressure sensor 54 detects this rapid pressure drop. In a case where the pressure drop per unit time is larger than predetermined specified drop pressure, the on-off valve control portion 10b of the controller 10 determines that the leakage is occurring at the fill passage 51. After the determination, the on-off valve control portion 10b closes the electromagnetic on-off valve 7 to prevent the leakage from the fill passage 51 (see a solid line in FIG. 3).

As above, since the leakage from the fill passage 51 can be detected by the high-pressure-side pressure sensor 54 configured to detect the pressure of the fuel gas flowing through the supply passage 4, an additional component, such as a gas sensor, is not required. Therefore, the number of parts of the fuel gas supplying and filling system 1 can be reduced, and the manufacturing cost can be reduced.

In addition, by using the supply passage 4 in both the supplying and filling operations of the fuel gas, the electromagnetic on-off valve 7 can be utilized as a shutoff valve when the leakage has occurred at the fill passage 51. Therefore, the airtightness and reliability of the fill passage 51 can be maintained without providing an additional shutoff valve on the fill passage 51, so that the number of valves can be reduced. With this, the number of parts of the fuel gas supplying and filling system 1 can be reduced significantly, and the manufacturing cost can be reduced.

Embodiments 2 and 3

Each of fuel gas supplying and filling systems 1A and 1B according to Embodiments 2 and 3 is similar in configuration to the fuel gas supplying and filling system 1 according to Embodiment 1. Therefore, regarding the fuel gas supplying and filling systems 1A and 1B, only components different from those of the fuel gas supplying and filling system 1 according to Embodiment 1 will be explained. The same reference signs are used for the same components, and a repetition of the same explanation is avoided.

Figure 4:
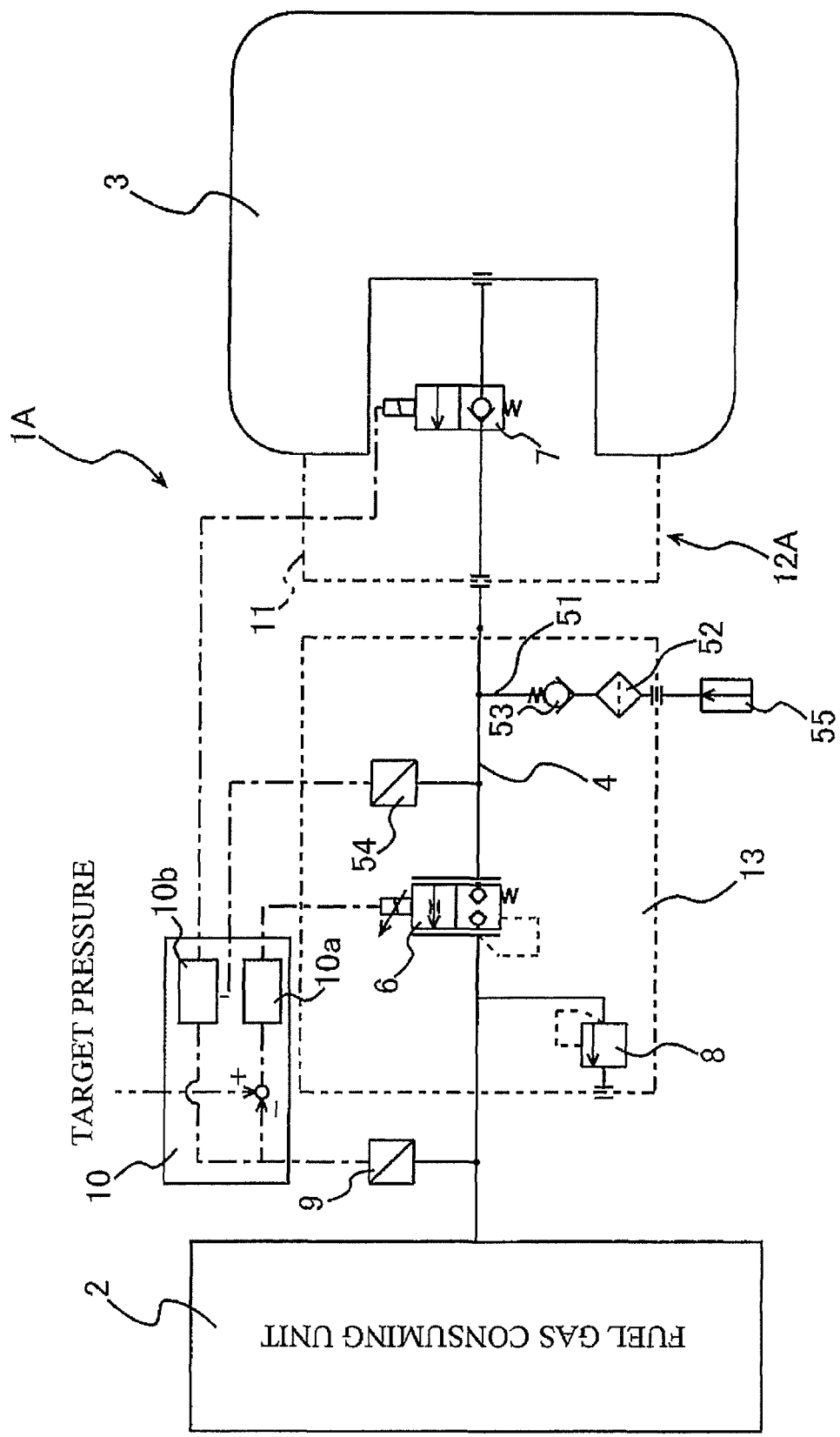
FIG. 4 is a circuit diagram showing the configuration of the fuel gas supplying and filling system of Embodiment 2.

In the fuel gas supplying and filling system 1A according to Embodiment 2, as shown in FIG. 4, only the electromagnetic on-off valve 7 is provided at the valve block 11, and a container main valve 12A is constituted by the electromagnetic on-off valve 7. The components other than the electromagnetic on-off valve 7, that is, the electromagnetic pressure regulating valve 6, the safety relief valve 8, the fill passage 51, and the high-pressure-side pressure sensor 54 are provided at a separate block 13 provided separately from the valve block 11.

Figure 5:
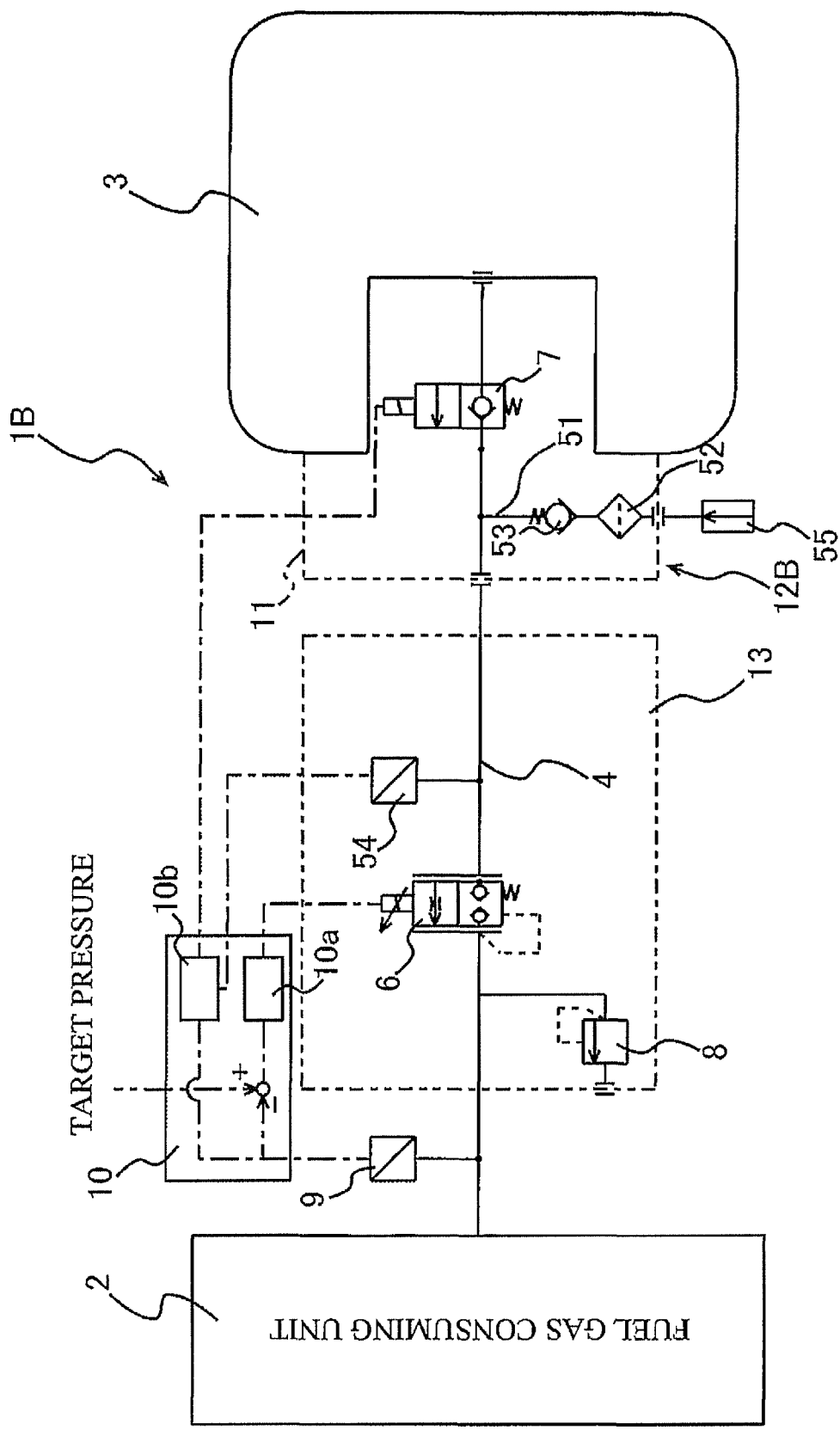
FIG. 5 is a circuit diagram showing the configuration of the fuel gas supplying and filling system of Embodiment 3.

In the fuel gas supplying and filling system 1B according to Embodiment 3, as shown in FIG. 5, the electromagnetic on-off valve 7 and the fill passage 51 are provided at the valve block 11, and a container main valve 12B is constituted by the electromagnetic on-off valve 7. The other components are provided at the separate block 13 provided separately from the valve block 11.

Even in a case where the components, such as the electromagnetic pressure regulating valve 6, are provided at the separate block 13, the supply pressure to the fuel gas consuming unit 2 can be stably maintained at the target pressure with a high degree of accuracy by the feedback control. Thus, a desired amount of fuel gas can be supplied to the fuel gas consuming unit 2 with a high degree of accuracy.

Other than the above, each of the fuel gas supplying and filling systems 1A and 1B according to Embodiments 2 and 3 has the same operational advantages as the fuel gas supplying and filling system 1 according to Embodiment 1.

Embodiment 4

Figure 6:
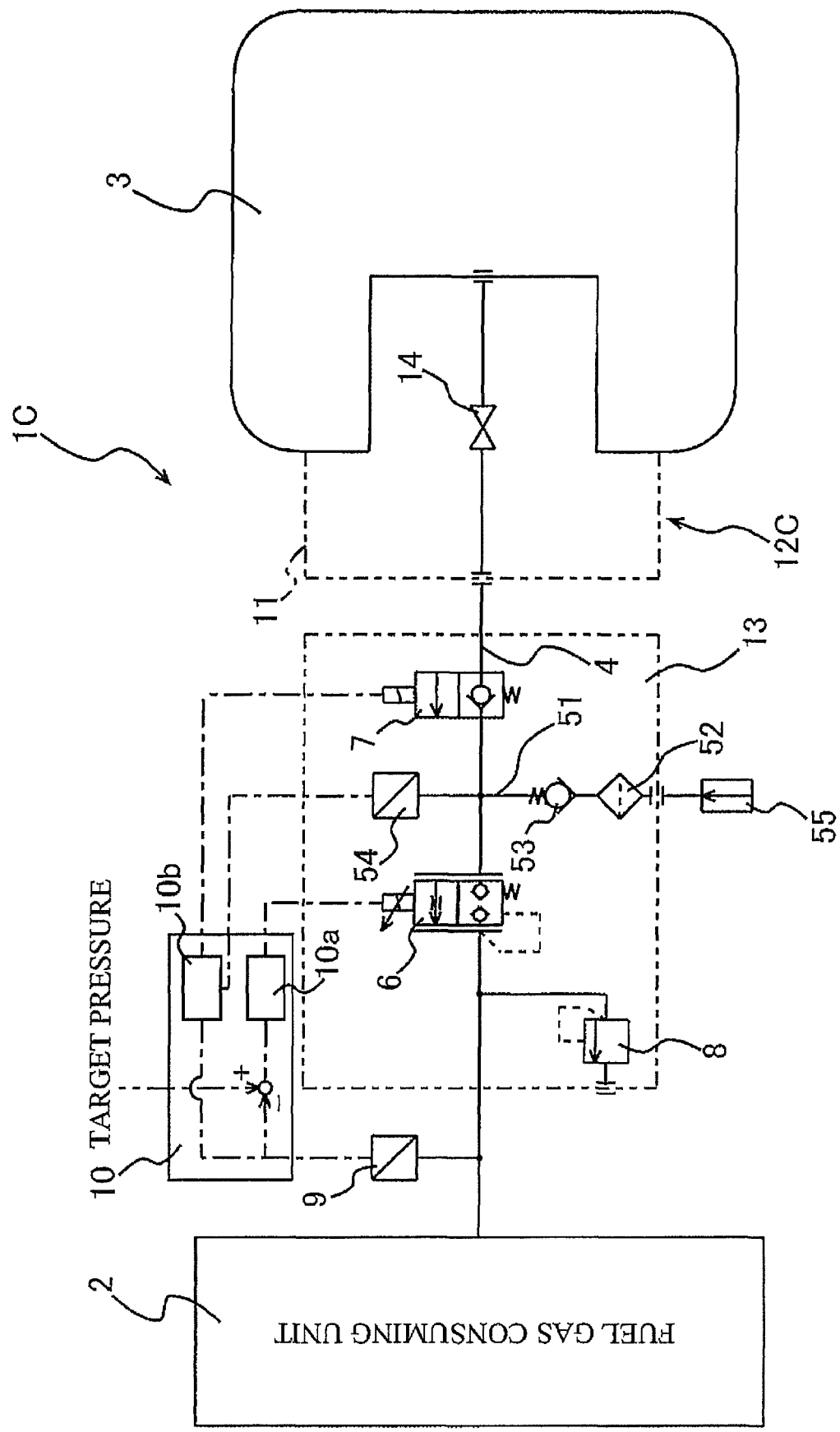
FIG. 6 is a circuit diagram showing the configuration of the fuel gas supplying and filling system of Embodiment 4.

As shown in FIG. 6, a fuel gas supplying and filling system 1C according to Embodiment 4 is similar in configuration to the fuel gas supplying and filling system 1 according to Embodiment 1. Therefore, regarding the fuel gas supplying and filling system 1C according to Embodiment 4, only components different from those of the fuel gas supplying and filling system 1 according to Embodiment 1 will be explained.

In the fuel gas supplying and filling system 1C according to Embodiment 4, the electromagnetic pressure regulating valve 6, the electromagnetic on-off valve 7, the safety relief valve 8, the fill passage 51, and the high-pressure-side pressure sensor 54 are provided at the separate block 13 provided separately from the valve block 11. In addition, a manual on-off valve 14 is provided at the valve block 11. The manual on-off valve 14 is provided on the supply passage 4 so as to be located further upstream of the electromagnetic on-off valve 7 and can open and close the supply passage 4. The manual on-off valve 14 is a manually manipulated valve configured to be operated manually. When the leakage from the supply passage 4 has occurred or when fixing the block 13 or replacing the block 13 with a new one, the manual on-off valve 14 is manipulated to close the supply passage 4. The manual on-off valve 14 configured as above constitutes a container main valve 12C.

Even in a case where the manual on-off valve 14 is provided on the supply passage 4 as above, the supply pressure to the fuel gas consuming unit 2 can be stably maintained at the target pressure with a high degree of accuracy by the feedback control. Thus, a desired amount of fuel gas can be supplied to the fuel gas consuming unit 2 with a high degree of accuracy.

Other than the above, the fuel gas supplying and filling system 1C according to Embodiment 4 has the same operational advantages as the fuel gas supplying and filling system 1 according to Embodiment 1.

Embodiment 5

A fuel gas supplying and filling system 1D according to Embodiment 5 is similar in configuration to the fuel gas supplying and filling system 1 according to Embodiment 1. Therefore, regarding the fuel gas supplying and filling system 1D according to Embodiment 5, only components different from those of the fuel gas supplying and filling system 1 according to Embodiment 1 will be explained.

Figure 7:
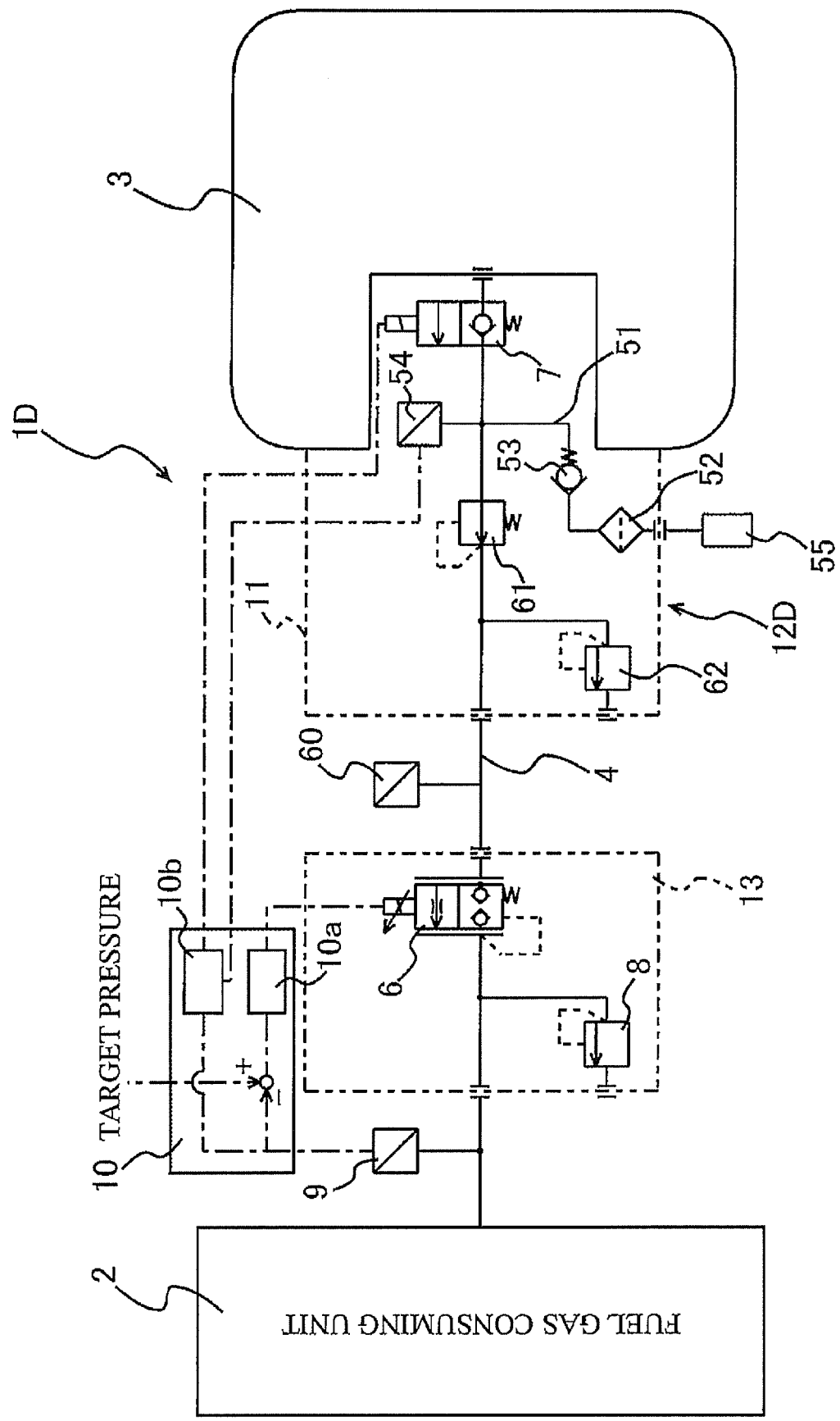
FIG. 7 is a circuit diagram showing the configuration of the fuel gas supplying and filling system of Embodiment 5.

As shown in FIG. 7, in the fuel gas supplying and filling system 1D, the electromagnetic pressure regulating valve 6 and the safety relief valve 8 are provided at the separate block 13 provided separately from the valve block 11, and an intermediate pressure sensor 60 is provided on the supply passage 4 so as to be interposed between the valve block 11 and the electromagnetic pressure regulating valve 6. In addition, the fuel gas supplying and filling system 1D further includes a mechanical pressure reducing valve 61 and an intermediate pressure relief valve 62. The mechanical pressure reducing valve 61, the intermediate pressure relief valve 62, the electromagnetic on-off valve 7, the fill passage 51, and the high-pressure-side pressure sensor 54 are provided at the valve block 11 and constitute a container main valve 12D.

The mechanical pressure reducing valve 61 is provided on the supply passage 4 so as to be interposed between the electromagnetic on-off valve 7 and the electromagnetic pressure regulating valve 6, more specifically, located downstream of the fill passage 51 and the high-pressure-side pressure sensor 54. The mechanical pressure reducing valve 61 is a valve configured to adjust the opening degree of the supply passage 4 in accordance with downstream pressure and reduce the downstream pressure to pressure higher than the supply pressure supplied to the fuel gas consuming unit 2. The intermediate pressure relief valve 62 is provided downstream of the mechanical pressure reducing valve 61. When the pressure between the pilot pressure reducing valve 61 and the electromagnetic pressure regulating valve 6 becomes predetermined pressure (pressure lower than withstand pressure in a pipe outside the electromagnetic pressure regulating valve 6 and the valve block 11), the intermediate pressure relief valve 62 operates to release the fuel gas to the atmosphere.

In the fuel gas supplying and filling system 1D configured as above, after the high pressure of the fuel gas is reduced to intermediate pressure by the mechanical pressure reducing valve 61, the intermediate pressure of the fuel gas is reduced to the low pressure by the electromagnetic pressure regulating valve 6. Therefore, the pressure of the fuel gas can be reduced to stable pressure with a high degree of accuracy. With this, the fuel gas of the mass flow rate which is highly accurate can be supplied to the fuel gas consuming unit 2. In addition, by reducing the high pressure of the fuel gas to the intermediate pressure by the mechanical pressure reducing valve 61, the output pressure level from the valve block 11 can be suppressed, and the pressure loss in the supply passage 4 can be suppressed as compared to a case where the high pressure of the fuel gas is reduced to the low pressure at once. By suppressing the pressure loss in the supply passage 4, the service limit pressure in the high-pressure tank 3 can be further lowered. Therefore, by reducing the high pressure of the fuel gas to the intermediate pressure, the service pressure limit of the high-pressure tank 3 can be lowered while improving the safety of the fuel gas supplying and filling system 1D.

Moreover, as with Embodiment 4, even if various components are provided on the supply passage 4, the supply pressure to the fuel gas consuming unit 2 can be maintained at stable pressure with a high degree of accuracy by the feedback control. Thus, a desired amount of fuel gas can be supplied to the fuel gas consuming unit 2 with a high degree of accuracy.

Other than the above, the fuel gas supplying and filling system 1D according to Embodiment 5 has the same operational advantages as the fuel gas supplying and filling system 1 according to Embodiment 1.

Other Embodiment

In Embodiments 1 to 5, the diaphragm seal 29 receives the secondary pressure $p_2$ of the pressure return chamber 31. However, the present embodiment is not limited to the diaphragm seal, and a low-pressure sealing member, such as an O ring, may be used. In this case, by making an outer diameter of a lower end side of the valve body 24 larger than the seat diameter, the present embodiment can obtain the same operational advantages as the electromagnetic pressure regulating valve 6 according to Embodiment 1. The electromagnetic pressure regulating valve 6 of the present embodiment is a push-type electromagnetic pressure regulating valve. However, the electromagnetic pressure regulating valve 6 of the present embodiment may be a pull-type electromagnetic pressure regulating valve.

In addition, although the ECU and the controller 10 are configured separately in Embodiments 1 to 5, the controller 10 may be incorporated in the ECU.

Each of Embodiments 1 to 5 shows an example of the arrangement of the respective components, but the arrangement may be changed without changing a basic component circuit. For example, in Embodiment 5, the mechanical pressure reducing valve 61 may be provided at the separate block. Further, components may be added, eliminated, or changed within the spirit of the present invention. For example, the intermediate pressure relief valve 62 may be eliminated, or an electromagnetic on-off valve configured to urgently shut off the supply passage 4 may be added so as to be located downstream of the electromagnetic pressure regulating valve 6.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The present invention is applicable to a fuel gas supplying and filling system for a fuel gas consuming unit, such as a gas engine or a fuel cell, the fuel gas supplying and filling system being configured to supply a fuel gas to the fuel gas consuming unit.

REFERENCE SIGNS LIST

1, 1A to 1D fuel gas supplying and filling system
2 fuel gas consuming unit
3 high-pressure tank
4 supply passage
6 electromagnetic pressure regulating valve
7 electromagnetic on-off valve
9 low-pressure-side pressure sensor
10 controller
12, 12A to 12D container main valve
21 housing
21a primary port
21c secondary port
22 valve passage
24 valve body
27 bearing member
28 high-pressure sealing member
29 diaphragm seal
31 pressure return chamber
33 return spring
34 electromagnetic solenoid
51 fill passage
53 check valve
54 high-pressure-side pressure sensor
55 filling opening

The invention claimed is:

1. A fuel gas supplying and filling system comprising:
a supply passage configured to connect a fuel gas consuming unit configured to consume a fuel gas and a high-pressure tank configured to store the fuel gas of high pressure;
a normally closed electromagnetic pressure regulating valve provided on the supply passage and configured to regulate pressure of the fuel gas flowing through the supply passage, to pressure corresponding to a current supplied to the electromagnetic pressure regulating valve and close the supply passage when the current supplied to the electromagnetic pressure regulating valve is stopped;
an electromagnetic on-off valve provided on the supply passage so as to be located upstream of the electromagnetic pressure regulating valve and configured to be able to open and close the supply passage;
a low-pressure-side pressure detector provided on the supply passage and configured to detect the gas pressure at a portion closer to the fuel gas consuming unit than the electromagnetic pressure regulating valve; and
a control unit configured to control the current supplied to the electromagnetic pressure regulating valve such that the gas pressure detected by the low-pressure-side pressure detector becomes predetermined target pressure, wherein:
a fill passage is connected to a portion of the supply passage, the portion being located between the electromagnetic pressure regulating valve and the electromagnetic on-off valve;
the fill passage is configured such that the fuel gas of the high pressure is able to be filled through a filling opening;
when the fuel gas of the high pressure is introduced through the filling opening, the electromagnetic on-off valve opens the supply passage;
the electromagnetic pressure regulating valve includes
a housing including a valve passage connecting a primary port connected to the high-pressure tank and a secondary port connected to the fuel gas consuming unit,
a valve body provided in the housing and configured to move between a closed position where the valve body closes the valve passage and an open position where the valve body opens the valve passage to control an opening degree of the valve passage,
a return spring configured to bias the valve body in a direction toward the closed position,
an electromagnetic proportional solenoid configured to apply a magnetizing force, corresponding to the current supplied from the control unit, to the valve body to cause the valve body to move in a direction toward the open position,
a bearing member interposed between the valve body and the housing and configured to support the valve body such that the valve body is able to slide between the closed position and the open position, and a first sealing member and a second sealing member configured to respectively seal both sides of the bearing member;

a pressure return chamber connected to the secondary port is formed in the housing; and the first sealing member applies an acting force, corresponding to internal pressure of the pressure return chamber, to the valve body to cause the valve body to move in the direction toward the closed position.

2. The fuel gas supplying and filling system according to claim 1, further comprising:

a check valve provided on the fill passage and configured to allow the fuel gas to flow through the filling opening toward the supply passage and block the fuel gas flowing in its opposite direction; and a leakage detecting unit configured to detect leakage from the fill passage, wherein in a case where the control unit determines based on a detection result of the leakage detecting unit that the leakage from the fill passage is occurring, the control unit causes the electromagnetic on-off valve to shut off the supply passage.

3. The fuel gas supplying and filling system according to claim 2, wherein:

the leakage detecting unit is a high-pressure-side pressure detector provided on the supply passage and configured to detect gas pressure between the pressure regulating valve and the electromagnetic on-off valve; and in a case where the gas pressure detected by the high-pressure-side pressure detector is rapidly dropping, the control unit determines that the leakage from the fill passage is occurring.

4. The fuel gas supplying and filling system according to claim 1, wherein:

the valve body includes a secondary side pressure receiving portion on which pressure of the secondary port acts in a direction in which the valve body moves toward the open position and a pressure return chamber side pressure receiving portion on which pressure of the pressure return chamber acts in a direction in which the valve body moves toward the closed position; and a pressure receiving area of the pressure return chamber side pressure receiving portion is larger than a pressure receiving area of the secondary side pressure receiving portion.

5. The fuel gas supplying and filling system according to claim 1, wherein:

the valve body includes a first pressure receiving surface on which pressure of the primary port acts in a direction in which the valve body moves toward the open position and a second pressure receiving surface on which the pressure of the primary port acts in a direction in which the valve body moves toward the closed position; and a pressure receiving area of the first pressure receiving surface and a pressure receiving area of the second pressure receiving surface are substantially equal to each other.

6. The fuel gas supplying and filling system according to claim 1, wherein the low-pressure-side pressure detecting unit is provided near the the fuel gas consuming unit.

7. The fuel gas supplying and filling system according to claim 1, wherein when the gas pressure detected by the low-pressure-side pressure detecting unit becomes predetermined allowable pressure or higher, the control unit stops the current supplied to the electromagnetic pressure regulating valve.

8. The fuel gas supplying and filling system according to claim 1, wherein the electromagnetic on-off valve is included in an in tank type or on tank type electromagnetic container main valve provided at a supply port of the high-pressure tank.

9. The fuel gas supplying and filling system according to claim 1 wherein the electromagnetic pressure regulating valve is included in an in tank type or on tank type electromagnetic container main valve provided at a supply port of the high-pressure tank.

* * * * *